US012062856B2

(12) United States Patent
Hsu et al.

(10) Patent No.: US 12,062,856 B2
(45) Date of Patent: Aug. 13, 2024

(54) ANTENNA COUPLED FEED MODULE AND ELECTRONIC DEVICE WITH SAME

(71) Applicant: FIH CO., LTD., New Taipei (TW)

(72) Inventors: Cho-Kang Hsu, New Taipei (TW); Min-Hui Ho, New Taipei (TW)

(73) Assignee: FIH CO., LTD., New Taipei (TW)

( * ) Notice: Subject to any disclaimer, the term of this patent is extended or adjusted under 35 U.S.C. 154(b) by 305 days.

(21) Appl. No.: 17/828,315

(22) Filed: May 31, 2022

(65) Prior Publication Data

US 2023/0361487 A1 Nov. 9, 2023

(30) Foreign Application Priority Data

May 7, 2022 (CN) ......................... 202210490801.5

(51) Int. Cl.
*H01Q 1/38* (2006.01)
*H01Q 9/04* (2006.01)
*H01Q 21/28* (2006.01)

(52) U.S. Cl.
CPC ............... *H01Q 21/28* (2013.01); *H01Q 1/38* (2013.01); *H01Q 9/0407* (2013.01)

(58) Field of Classification Search
CPC ........ H01Q 21/28; H01Q 1/38; H01Q 9/0407; H01Q 1/243
See application file for complete search history.

(56) References Cited

U.S. PATENT DOCUMENTS 11,011,827 B2 * 5/2021 Thai ........................ H01Q 1/243
2020/0212584 A1 * 7/2020 Park ........................ H01Q 13/16

FOREIGN PATENT DOCUMENTS

CN 110165386 A 8/2019

* cited by examiner

*Primary Examiner* — David E Lotter
(74) *Attorney, Agent, or Firm* — ScienBiziP, P.C.

(57) ABSTRACT

An antenna coupled feed module is received in a slit formed between a metal frame and at least one electronic component of an electronic device. The antenna coupled feed module includes a substrate, at least one coupled feed portion, an active circuit, a metal layer, and a non-conductive layer. The coupled feed portion and the active circuit are disposed on opposite surfaces of the substrate; the coupled feed portion couples the electrical signals to the metal layer, the metal layer conducts the electrical signals to the metal frame to radiate wireless signals; the non-conductive layer is arranged between the metal layer and the at least one coupled feed portion, and covers the coupled feed portion; the active circuit switches the electrical signals fed to the coupled feed portion. An electronic device with the antenna coupled feed module is also provided.

20 Claims, 12 Drawing Sheets

ANTENNA COUPLED FEED MODULE AND ELECTRONIC DEVICE WITH SAME

CROSS-REFERENCE TO RELATED APPLICATIONS

This application claims priority to Chinese Patent Application No. 202210490801.5 filed on May 7, 2022, in China National Intellectual Property Administration, the contents of which are incorporated by reference herein.

TECHNICAL FIELD

The present disclosure relates to the field of wireless communications technology, in particular to an antenna coupled feed module and an electronic device having the antenna coupled feed module.

BACKGROUND

With the advancement of wireless communication technology, electronic devices such as mobile phones continue to develop toward the trend of diversified functions, thinner and lighter, and faster and more efficient data transmission. The space that can receive antennas is getting smaller and smaller, and with the continuous development of wireless communication technology, the demand for antenna bandwidth continues to increase. How to design an antenna with a wider bandwidth and better efficiency in a limited space is an important issue facing antenna design.

Therefore, there is a room for improvement.

DETAILED DESCRIPTION

Figure 1:
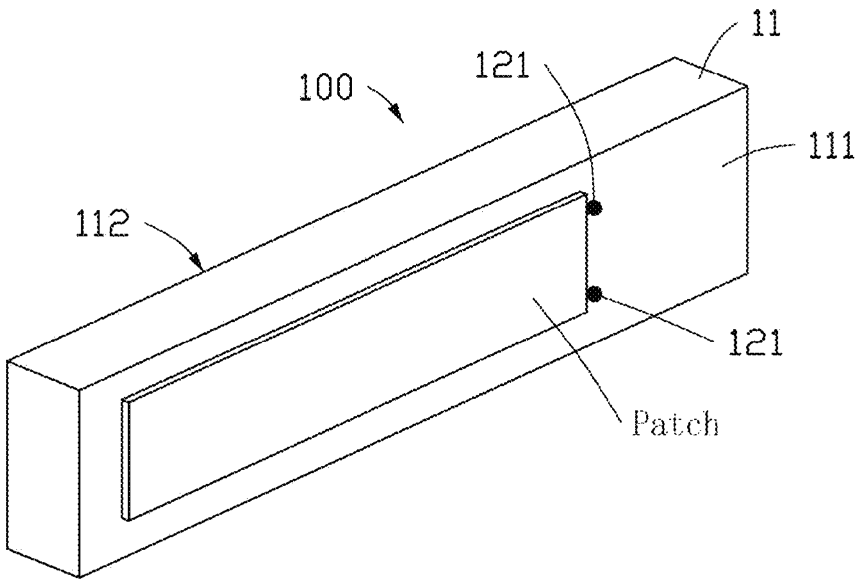
FIG. 1 is a schematic diagram of an antenna coupled feed module of an embodiment of the present disclosure.

In order to make the purpose, technical solutions and advantages of the embodiments of the present disclosure clearer, the technical solutions in the embodiments of the present disclosure will be described clearly and completely in conjunction with the drawings in the embodiments of the present disclosure. Based on the embodiments of the present disclosure, all other embodiments obtained by those of ordinary skill in the art without creative work shall fall within the scope of protection of the present disclosure.

Those skilled in the art should understand that, in the disclosure of the present disclosure, "at least one" refers to one or more, and "multiple" refers to two or more. Unless otherwise defined, all technical and scientific terms used herein have the same meaning as commonly understood by those skilled in the technical field in the present disclosure. The terminology used in the specification of present disclosure is only for the purpose of describing specific embodiments, and is not intended to limit the present disclosure.

It can be understood that, unless otherwise specified in the present disclosure, "/" means "or". For example, "A/B" can mean A or B. "A and/or B" in the present disclosure is only an association relationship describing the associated objects, which means that there can be three relationships: only A, only B, and A and B.

It can be understood that, in the disclosure of the present disclosure, the words such as "first" and "second" are only used for the purpose of distinguishing description, and cannot be understood as indicating or implying relative importance, nor as indicating or implying order. The features defined as "first" and "second" may explicitly or implicitly include one or more of the features. In the description of the embodiments of the present disclosure, the words such as "exemplary" or "for example" are used as examples, illustrations, or illustrations. Any embodiment or design solution described as "exemplary" or "for example" in the embodiments of the present disclosure should not be construed as being more preferable or advantageous than other embodiments or design solutions. To be precise, the words such as "exemplary" or "for example" are used to present related concepts in a specific manner.

Those skilled in the art should understand that, in the disclosure of the present disclosure, the terms "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, which is only for the convenience of describing the present disclosure and to simplify the description, rather than indicating or implying that the device or element referred to must have a specific orientation, or be constructed and operated in a specific orientation, so the above terms should not be understood as limiting the present disclosure.

Figure 2:
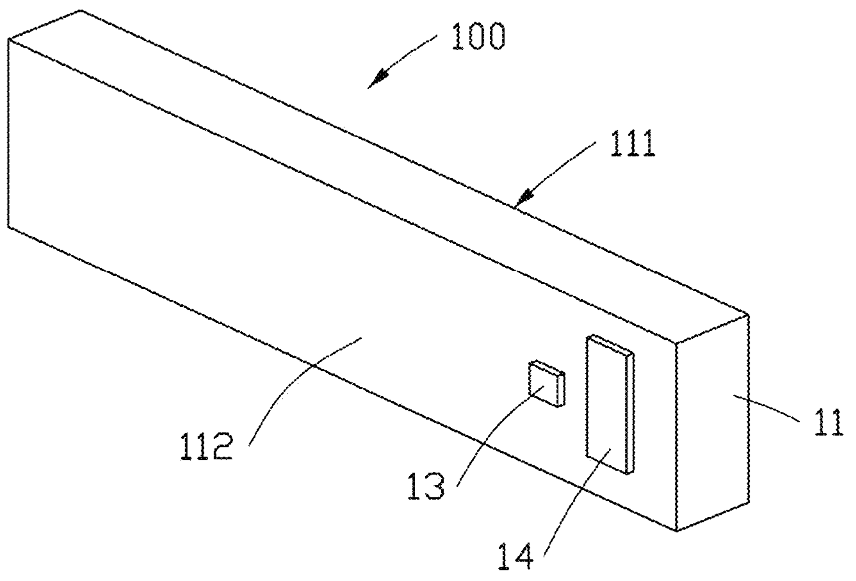
FIG. 2 is a schematic diagram of the antenna coupled feed module shown in FIG. 1 from another angle.
Figure 3A:
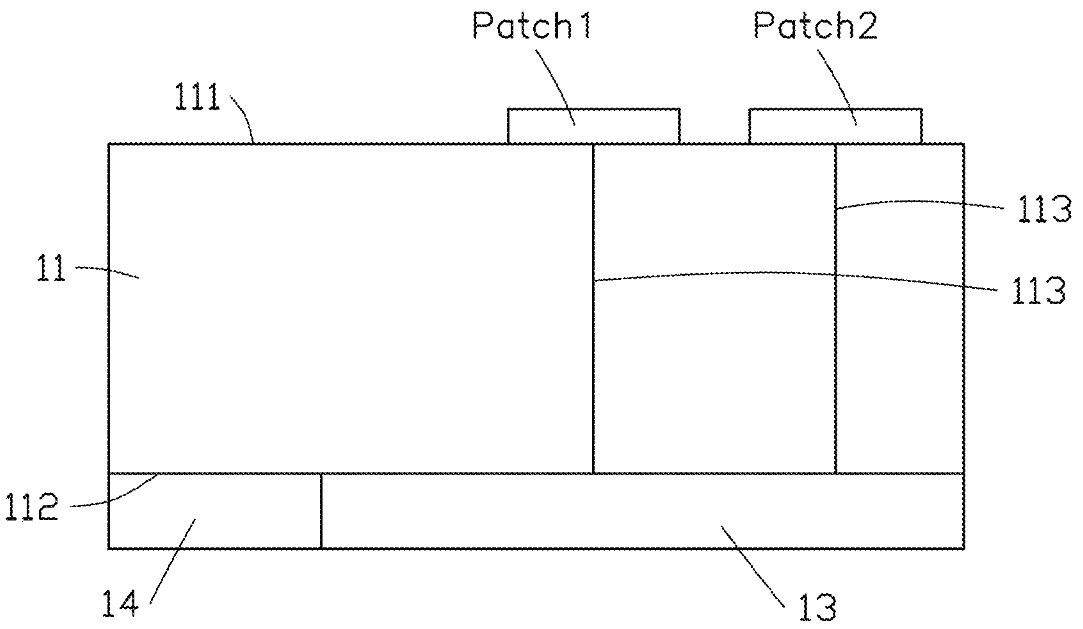
FIGS. 3A, 3B, and 3C are schematic diagrams of the antenna coupled feed module from another angle according to the embodiment of the present disclosure.
Figure 3B:
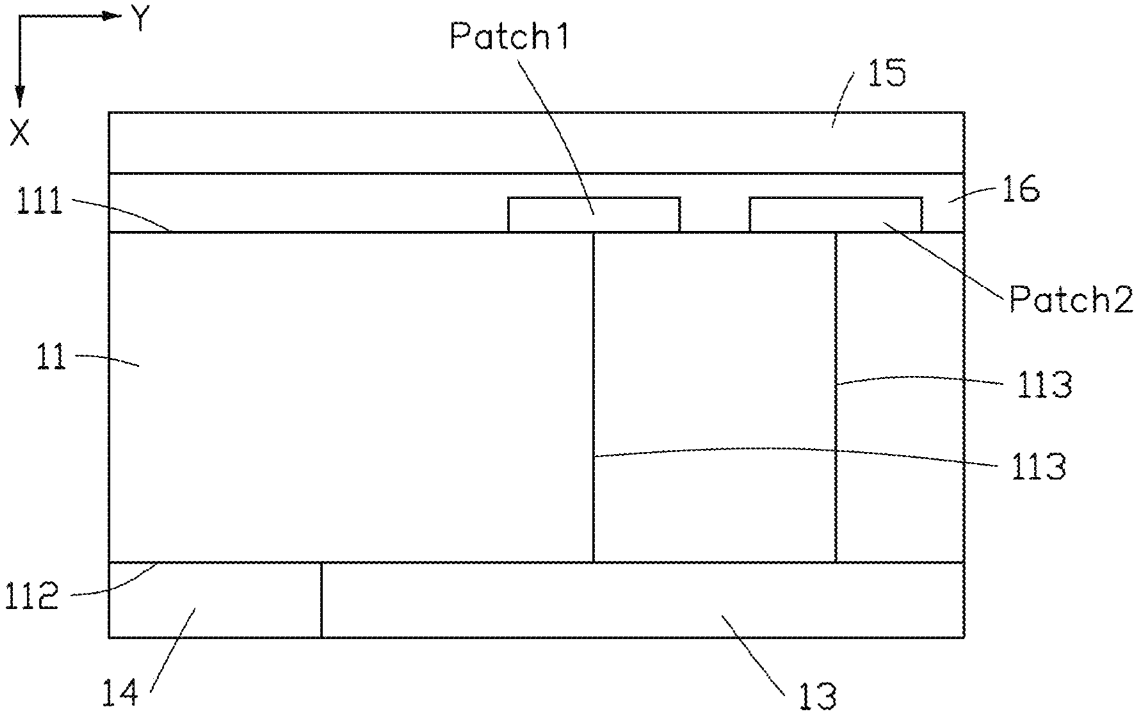

FIGS. 1, 2, and 3B illustrate an antenna coupled feed module 100 in accordance with an embodiment of the present disclosure. The antenna coupled feed module 100 includes a substrate 11, at least one coupled feed portion Patch, an active circuit 13 (shown in FIG. 2), a connector 14 (shown in FIG. 2), a metal layer 15, and a non-conductive layer 16 (shown in FIG. 3B).

The substrate 11 may be a dielectric substrate, for example, a printed circuit board (PCB), a ceramic (ceramics) substrate or other dielectric substrate, which is not specifically limited herein. The substrate 11 includes a first surface 111 and a second surface 112, and the second surface 112 is disposed opposite to the first surface 111.

Referring to FIG. 3A, in the embodiment of the present disclosure, the antenna coupled feed module 100 includes a first coupled feed portion, as shown Patch 1 in FIG. 3A, FIG.

Figure 3C:
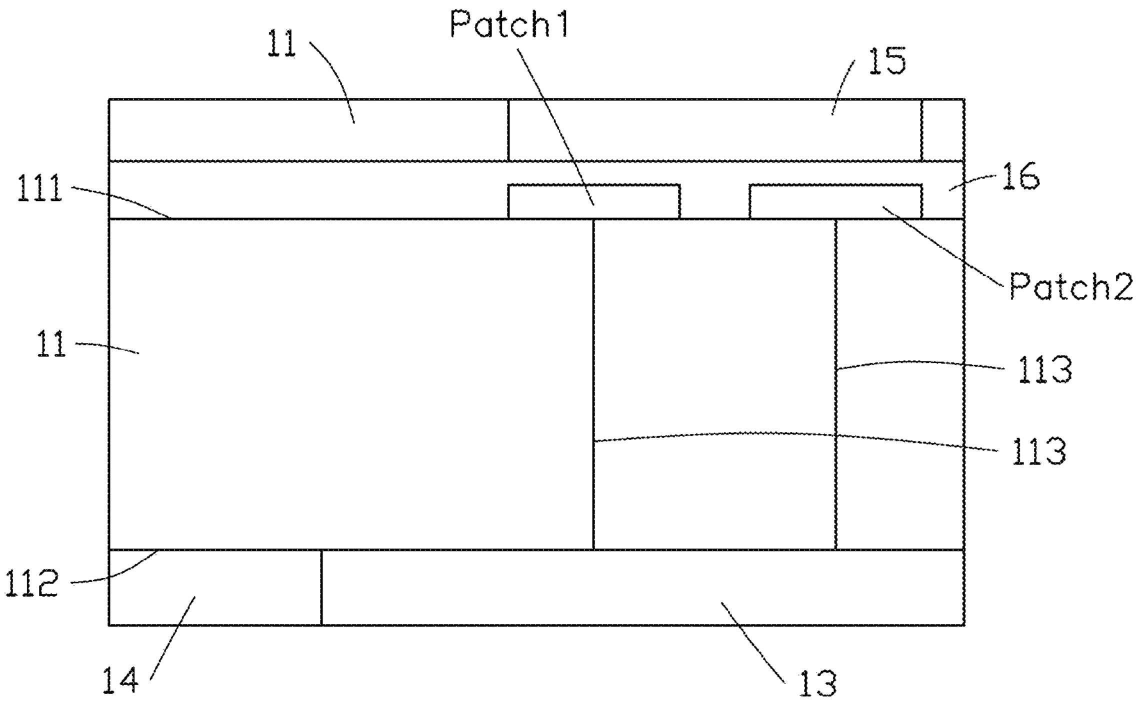

3B and FIG. 3C, and a second coupled feed portion, as shown Patch 2 in FIG. 3A, FIG. 3B and FIG. 3C, which overall are in a form of a metal sheet. The first coupled feed portion Patch 1 and the second coupled feed portion Patch 2 are disposed on the first surface 111 of the substrate 11. The first coupled feed portion Patch 1 and the second coupled feed portion Patch 2 may be connected to the second surface 112 of the substrate 11 through holes (vias) 113. It should be known that, Patch 1 and Patch 2 may be reference numbers for the first coupled portion and the second coupled portion in the description.

FIG. 3A, in one of the embodiments, shows the first coupled feed portion Patch 1 and the second coupled feed portion Patch 2; both are generally rectangular-shaped patches, and their surfaces do not have gaps, slots, or breakpoints, etc. At least one (for example, two are shown in the figures) signal feed points 121 is provided on one side of each of the first coupled feed portion Patch 1 and the second coupled feed portion Patch 2. The signal feed points 121 are used to electrically connect to a corresponding feeding source (not shown in the figures, see undermentioned details) through a matching circuit (not shown in the figures, see detailed later) and the holes (vias) 113, and electrical signals being thereby fed to the first coupled feed portion Patch 1 and the second coupled feed portion Patch 2.

The first coupled feed portion Patch 1 and the second coupled feed portion Patch 2 are spaced from each other. The embodiment of the present disclosure does not limit the specific shape and structure of the first coupled feed portion Patch 1 and the second coupled feed portion Patch 2. Shapes, structures, sizes, and a size ratio of the first coupled feed portion Patch 1 and the second coupled feed portion Patch 2 may be adjusted for different radiation frequencies, so as to provide wide frequency coupling effect through greater sizes of radiator. For example, the first coupled feed portion Patch 1 and the second coupled feed portion Patch 2 are close to but apart from a radiation body (the radiation body can be any conductor, such as iron, copper foil of a Flexible Printed Circuit on a PCB, a conductor in a laser direct structuring (LDS) process, etc., which are not specifically limited here), and are configured to couple electrical signals to the radiation body, so the radiation body may transmit and receive wireless signals. The greater the size of the coupled feed portion is, the greater the frequency range will be, so as to provide wider radiation frequencies.

FIGS. 2 and 3A, in the embodiment of the present disclosure, show that the active circuit 13 is disposed on the second surface 112 of the substrate 11. The second surface 112 of the substrate 11 is provided with connection lines (not shown). The connection lines are connected to the active circuit 13. The active circuit 13 may include a switch, and/or other adjustable elements that can change or switch impedances (not shown in the figures, see details below). The active circuit 13 may be electrically connected to the first coupled feed portion Patch 1 and the second coupled feed portion Patch 2 and the connector 14 through the connection line. For example, in one of the embodiments, the substrate 11 is further provided with the holes (vias) 113, and the first coupled feed portion Patch 1 and the second coupled feed portion Patch 2 may be connected to the second surface 112 of the substrate 11 through the holes (vias) 113, and connected to the active circuit 13 through the connection lines on the second surface 112.

The connector 14 is arranged on the second surface 112 of the substrate 11, that is, the connector 14 is arranged on the surface where the active circuit 13 is located. In some embodiments, the connector 14 and the active circuit 13 may be spaced apart and electrically connected to each other. In the embodiment of the present disclosure, the specific positional relationship and connection relationship between the connector 14 and the active circuit 13 are not limited. For example, in one of the embodiments, the active circuit 13 can be disposed in the connector 14, the connector 14 can be used to accommodate the active circuit 13. The connector 14 is electrically connected to the active circuit 13 and connected to a corresponding transmission line, to realize signal transmission of the antenna coupled feed module 100 through the transmission lines, for example, for signal sending or receiving.

It can be understood that the transmission line can be, but is not limited to, a coaxial cable, a flexible printed circuit board (FPCB) or other transmission lines.

FIG. 3B and FIG. 3C show that the non-conductive layer 16 is arranged between the metal layer 15 and the at least one coupled feed portion Patch, and the non-conductive layer 16 covers the at least one coupled feed portion Patch. In detail, the non-conductive layer 16 covers the first surface 111 of the substrate 11 and the first coupled feed portion Patch 1 and the second coupled feed portion Patch 2. In one of the embodiments, the non-conductive layer 16 is made of non-conductive materials, such as one or more materials from fire resistant materials FR4, aluminum oxide (AL2O3), Arlon materials, and ceramics, etc.

The metal layer 15 is arranged at a side of the non-conductive layer 16 that is away from the substrate 11. A shape and a size of the metal layer 15 may be adjusted according to different radiation requirements. In one of the embodiments, referring to FIG. 3B, an area of the metal layer 15 corresponds to an area of the non-conductive layer 16. That is, a projection area of the metal layer 15 along a first direction is substantially same as a projection area of the non-conductive layer 16 along the first direction, and the projection area of the metal layer 15 along the first direction is greater than a projection area of the first coupled feed portion Patch 1 and a second coupled feed portion Patch 2 along the first direction. The first direction may be a direction of the metal layer 15 and the non-conductive layer 16 facing the substrate 11, or can be a direction along a thickness of the substrate 11, such as the X direction shown in FIG. 3B. In another embodiment, referring to FIG. 3C, the area of the metal layer 15 corresponds to an area of the first coupled feed portion Patch 1 and the second coupled feed portion Patch 2. That is, the projection area of the metal layer 15 along the first direction is substantially same as a projection area of the first coupled feed portion Patch 1 and the second coupled feed portion Patch 2 along the first direction, a projection position of the first coupled feed portion Patch 1 and the second coupled feed portion Patch 2 corresponding to a projection position of the metal layer 15. The first coupled feed portion Patch 1 and the second coupled feed portion Patch 2 are positioned within a projected range of the metal layer 15 along the first direction. The projection area of the metal layer 15 along the first direction is smaller than the projection area of the non-conductive layer 16 along the first direction, and the metal layer 15 is positioned within a projected range of the non-conductive layer 16 along the first direction.

The first coupled feed portion Patch 1 and the second coupled feed portion Patch 2 respectively supply electrical signals from the active circuit 13 through signal feed points 121, and further couple the electrical signals to the metal layer 15. The metal layer 15 conducts the electrical signals to the radiation body (the radiation body can be any conductor, such as iron, copper foil of a Flexible Printed Circuit on a PCB, a conductor in a laser direct structuring (LDS) process, etc., which are not specifically limited here). In addition, the antenna coupled feed module 100 allows the switch of the active circuit 13 to switch between multiple modes, thereby realizing multiple broadband operations.

For example, in one of the embodiments, when the first coupled feed portion Patch 1 and the second coupled feed portion Patch 2 are spaced from each other, and arranged to resist the radiation body through the metal layer 15, the radiation body may receive 4G/5G intermediate frequency signals (frequency range of 1.7 GHz-2.2 GHz), high frequency signals (frequency range of 2.3 GHz-2.7 GHz), ultra high band (UHB) signals (frequency range of 3.3 GHz-5 GHz), GPS signals (frequency range of 1.5 GHz-1.6 GHz), and WI-FI signals (frequency range of 2.4 GHz, 5 GHz).

In the embodiment of the present disclosure, the radiation frequencies of the antenna coupled feed module 100 are not limited. For example, the shape, length, width and other characteristics of the antenna coupled feed module 100 can be adjusted to achieve a required frequency or frequencies. The shape, length, width and other characteristics of the coupled feed portion Patch can also be adjusted according to the required frequency or frequencies.

Figure 4:
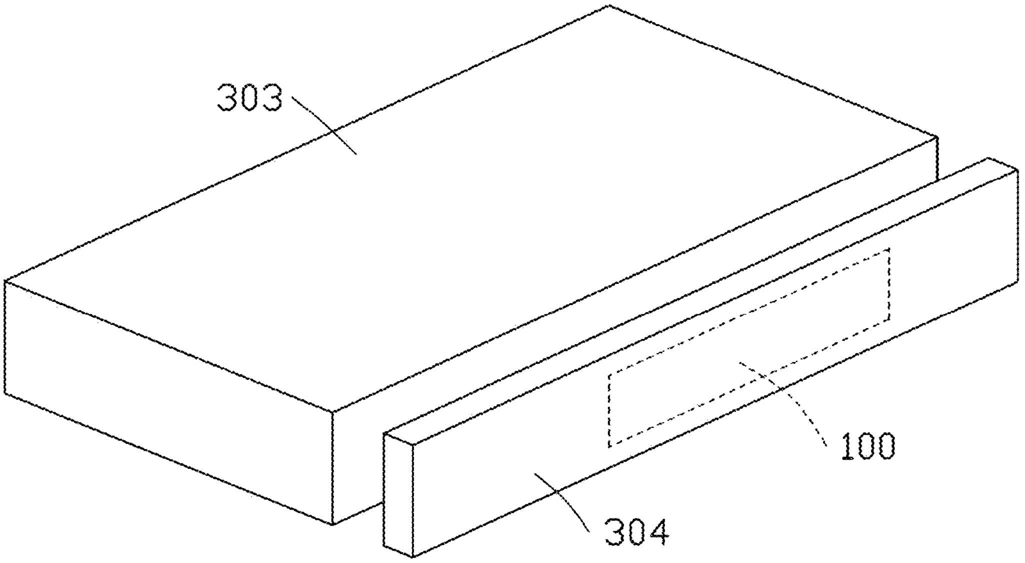
FIG. 4 is a schematic diagram of the antenna coupled feed module arranged on one side of a metal frame of an electronic device according to an embodiment of the present disclosure.
Figure 5:
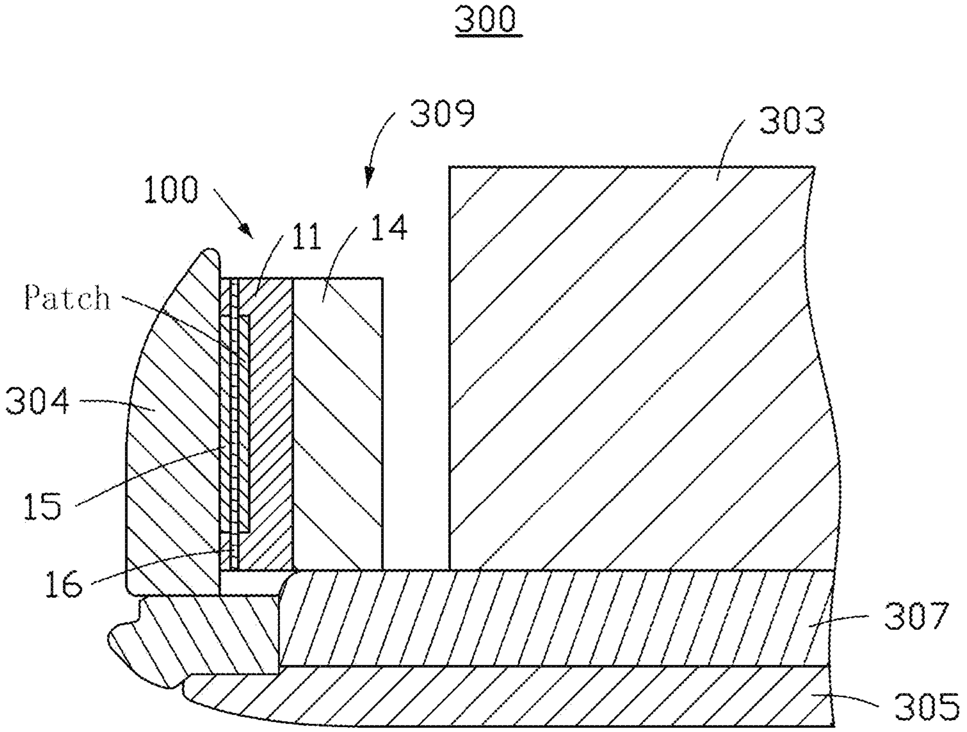
FIG. 5 is a schematic diagram of the antenna coupled feed module and the metal frame shown in FIG. 4 at another angle.

In the embodiment of the present disclosure, referring to FIGS. 4 and 5, the antenna coupled feed module 100 may be applied in an electronic device 300 having a metal frame 304 and at least one electronic component 303. The metal frame 304 and the at least one electronic component 303 are spaced from each other and a slit 309 is formed therebetween. The antenna coupled feed module 100 may be arranged in the slit 309. The metal layer 15 faces and is in contact with the metal frame 304, meanwhile, the at least one coupled feed portion Patch (such as the first coupled feed portion Patch 1 and the second coupled feed portion Patch 2, as shown in FIGS. 3A and 3B) faces the metal frame 304. A side of the substrate 11 carrying the active circuit 13 and the connector 14 is spaced from the at least one electronic component 303.

In the embodiments of the present disclosure, the specific structure of the metal frame 304, and/or its connection relationship with other components are not limited. For example, the side of the metal frame 304 may be connected to ground (the metal frame 304 is grounded), or not connected to ground. For another example, the metal frame 304 may be provided with or without breakpoints, gaps and slots.

Figure 6:
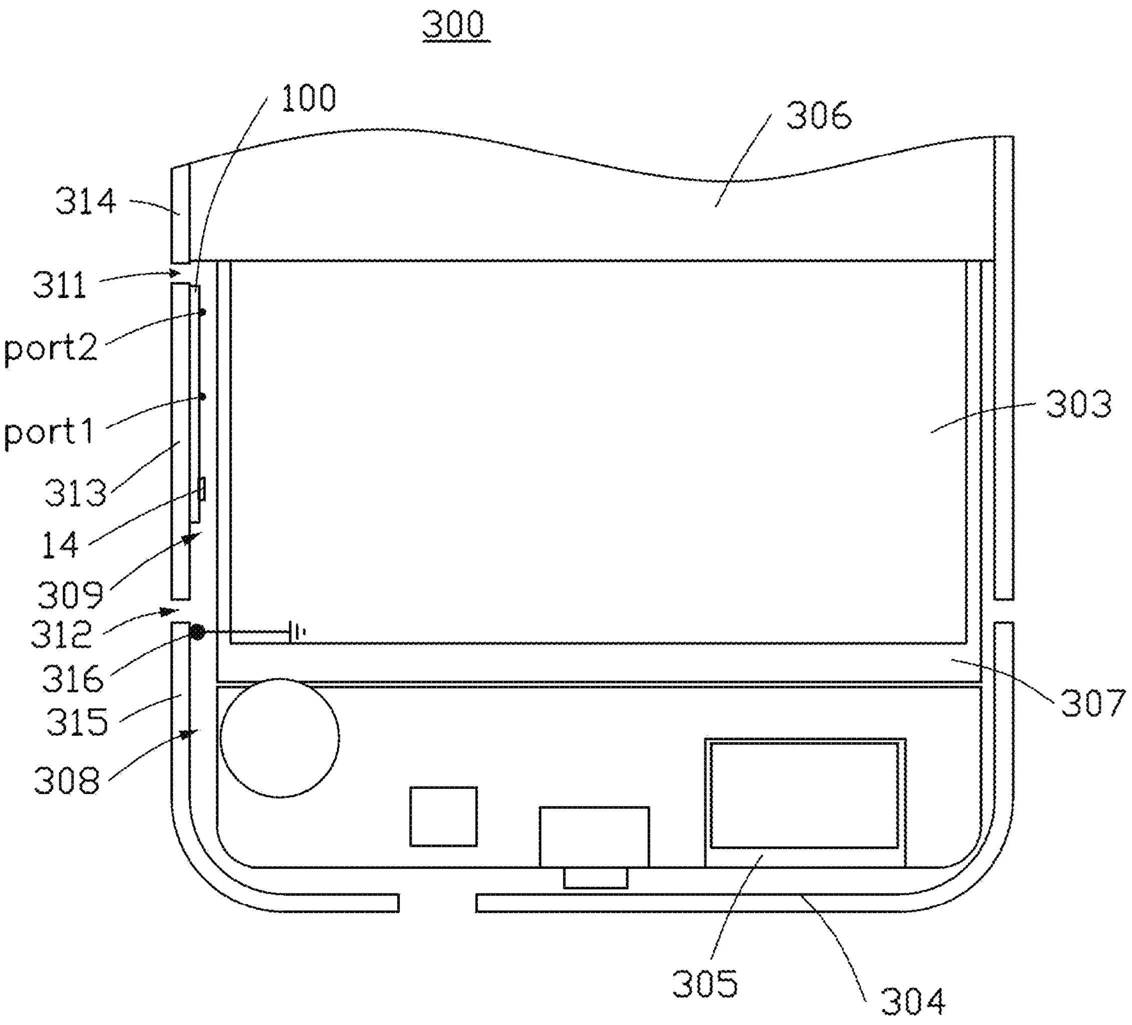
FIG. 6 is a schematic diagram of the antenna coupled feed module applied to the electronic device of an embodiment of the present disclosure.

FIG. 6, in an embodiment of the present disclosure, shows that the antenna coupled feed module 100 can be applied to the electronic device 300 to transmit and receive radio waves. The electronic device 300 may be a handheld communication device (such as a mobile phone), a foldable phone, a smart wearable device (such as a watch, earphone, etc.), a tablet computer, a personal digital assistant (personal digital assistant, PDA), not specifically limited here.

The electronic device 300 may adopt one or more of the following communication technologies: BLUETOOTH (BT) communication technology, global positioning system (GPS) communication technology, WI-FI communication technology, global system for mobile communications (GSM) communication technology, wideband code division multiple access (WCDMA) communication technology, long term evolution (LTE) communication technology, 5G communication technology, SUB-6G communication technology and other future communication technologies.

In the embodiment of the present disclosure, the electronic device 300 is a mobile phone.

FIG. 6, in one embodiment, shows that the electronic device 300 includes a battery 303, the metal frame 304, a backplane 305, a ground plane 306, and a middle frame 307 (shown in FIG. 5). The metal frame 304 is made of metal or other conductive material. The backplane 305 may be made of metal or other conductive material. The metal frame 304 is disposed on the edge of the backplane 305 and forms an accommodating space 308 together with the backplane 305. An opening (not shown in the figures) is provided on the side of the metal frame 304 opposite to the backplane 305, for accommodating a display unit (not shown).

The display unit has a display plane, and the display plane is exposed at the opening. It can be understood that the display unit can be combined with a touch sensor to form a touch screen. The touch sensor can also be called touch panel or touch sensitive panel.

In the embodiment of the present disclosure, the display unit has a high screen-to-body ratio. That is, the area of the display plane of the display unit is greater than 70% of the front area of the electronic device, and even a full front screen can be achieved. Specifically, in the embodiment of the present disclosure, full screen means that, except for the necessary slots opened on the electronic device 300, the left, right, and lower sides of the display unit are seamlessly connected to the metal frame 304.

The ground plane 306 may be made of metal or other conductive material. The ground plane 306 can be disposed in the accommodating space 308 enclosed by the metal frame 304 and the backplane 305, and is connected to the backplane 305.

The middle frame 307 is made of metal or other conductive material. The shape and size of the middle frame 307 can be smaller than those of the ground plane 306. The middle frame 307 is stacked on the ground plane 306. In this embodiment, the middle frame 307 is a metal sheet disposed between the display unit and the ground plane 306. The middle frame 307 is used to support the display unit, provide electromagnetic shielding, and improve the mechanical strength of the electronic device 300.

In the embodiment, the metal frame 304, the backplane 305, the ground plane 306, and the middle frame 307 may form an integral metal frame. The backplane 305, the ground plane 306, and the middle frame 307 are made of metal with large surface areas, so they can jointly form the system ground plane (not shown in the figures) of the electronic device 300.

The battery 303 is arranged on the middle frame 307 to provide electrical energy for the electronic components, modules, circuits of the electronic device 300. The battery 303 and the metal frame 304 are spaced apart, and the slit 309 is formed between the battery 303 and the metal frame 304.

In other embodiment, the electronic device 300 may also include one or more electronic components, for example, a processor, a circuit board, a memory, an input and output circuit, an audio component (such as a microphone and a speaker), and a multimedia component (such as a front camera and/or a rear camera), and a sensory component (such as a proximity sensor, a distance sensor, an ambient light sensor, an acceleration sensor, a gyroscope, a magnetic sensor, a pressure sensor and/or a temperature sensor).

When the antenna coupled feed module 100 is applied to the electronic device 300, the antenna coupled feed module 100 can be arranged in the slit 309 and arranged to be substantially perpendicular to the plane of the ground plane 306. A part of the metal frame 304 constitutes the radiation body, and a first gap 311 and a second gap 312 are defined on the metal frame 304. The first gap 311 and the second gap 312 cut through the metal frame 304, and divide the metal frame 304 into a first part 313, a second part 314, and a third part 315, arranged at intervals. The first part 313, the second part 314, and the third part 315 may each radiate wireless signals. The second part 314 may be electrically connected to the system ground, such as the ground plane 306.

The first part 313, the second part 314, and the third part 315 may be connected to the slit 309 and be filled with insulating materials, such as plastic, rubber, glass, wood, ceramics, but not limited to this.

In one embodiment, a ground point 316 is provided on the side of the third part 315 close to the second gap 312. One end of the ground point 316 is electrically connected to the third part 315, and the other end is electrically connected to the middle frame 307, that is, grounded. The antenna coupled feed module 100 is disposed in the slit 309 between the first part 313 and the ground point 316, and is disposed substantially perpendicular to the plane of the ground plane 306.

When the antenna coupled feed module 100 is disposed in the slit 309, the first coupled feed portion Patch 1 and the second coupled feed portion Patch 2 on the antenna coupled feed module 100 face and are spaced apart from the first part 313, the metal layer 15 faces and contacts the first part 313. The connector 14 is arranged on the other surface of the substrate 11, that is, it is arranged away from the first part 313. One end of the connector 14 is electrically connected to the middle frame 307, and the other end is electrically connected to the substrate 11.

In another embodiment, the antenna coupled feed module 100 corresponds to the first part 313, the second gap 312, and the third part 315. The metal layer 15 faces and contacts the first part 313 and the third part 315, the first coupled feed portion Patch 1 faces and is spaced apart from the third part 315, and the second coupled feed portion Patch 2 faces and is spaced apart from the first part 313. Thus, the antenna coupled feed module 100 may feed electrical signals into the first part 313 and the third part 315.

Figure 7:
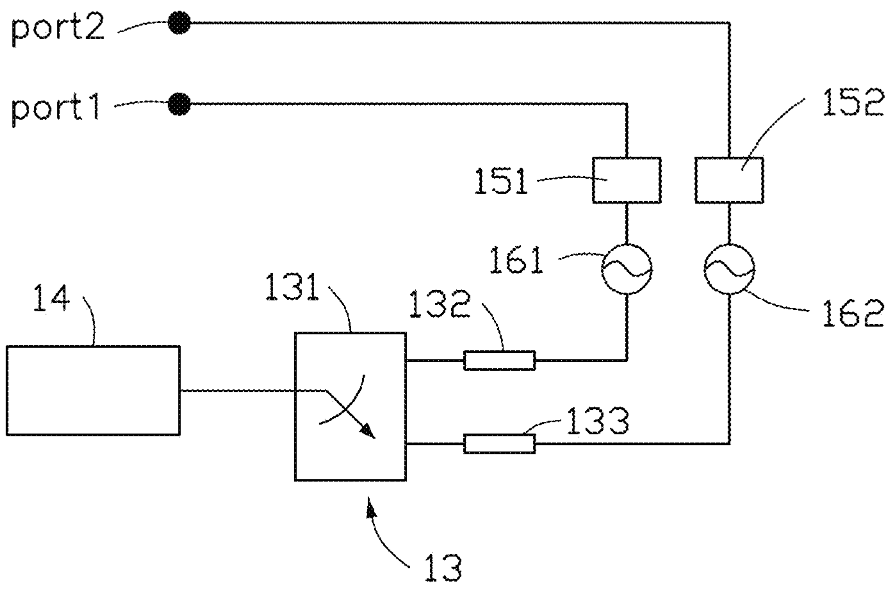
FIG. 7 is a schematic diagram of the circuit connection of the active circuit of the antenna coupled feed module shown in FIG. 6.

FIG. 6 and FIG. 7 shows that each of the first coupled feed portion Patch 1 and the second coupled feed portion Patch 2 includes a signal feed point (for example, a first signal feed point port 1 and a second signal feed point port 2, the aforementioned signal feed point 121). Each signal feed point 121 is electrically connected to the feed source through the matching unit. For example, the first signal feed point port 1 of the first coupled feed portion Patch 1 is electrically connected to a first feeding source 161 through a first matching unit 151. The signal feed point port 2 of the second coupled feed portion Patch 2 is electrically connected to a second feeding source 162 through a second matching unit 152.

The active circuit 13 in the antenna coupled feed module 100 is disposed in the connector 14. As shown in FIG. 7, the active circuit 13 includes a switch 131 and a first adjustable element 132 and a second adjustable element 133. One end of the switch 131 is electrically connected to the connector 14, and the other end of the switch 131 is electrically connected to a feed source through first adjustable element 132 and second adjustable element 133. For example, the switch 131 is electrically connected to the first feeding source 161 through the first adjustable element 132, the switch 131 is electrically connected to the second feeding source 162 through the second adjustable element 133. That is, the matching circuit includes at least a first matching unit 151 and a second matching unit 152.

The first coupled feed portion Patch 1 and the second coupled feed portion Patch 2 feed in electrical signals and are coupled to the metal layer 15, the metal layer 15 conducts the electrical signals to the first part 313, the first part 313 further couples the electrical signals to the second part 314 and the third part 315. The coupling among the first coupled feed portion Patch 1, the second coupled feed portion Patch 2, first part 313, the second part 314 and the third part 315 resonates adjustable radiation modes. The coupling state between the first coupled feed portion Patch 1 and the second coupled feed portion Patch 2 can be controlled, and independent modes with tunability and good antenna efficiency can be generated through coupling. The switching of the switch 131 in the active circuit 13 can switch between multiple modes, and use multiple adjustable elements (for example, the first adjustable element 132 and second adjustable element 133) to achieve multiple frequency bands.

Figure 8:
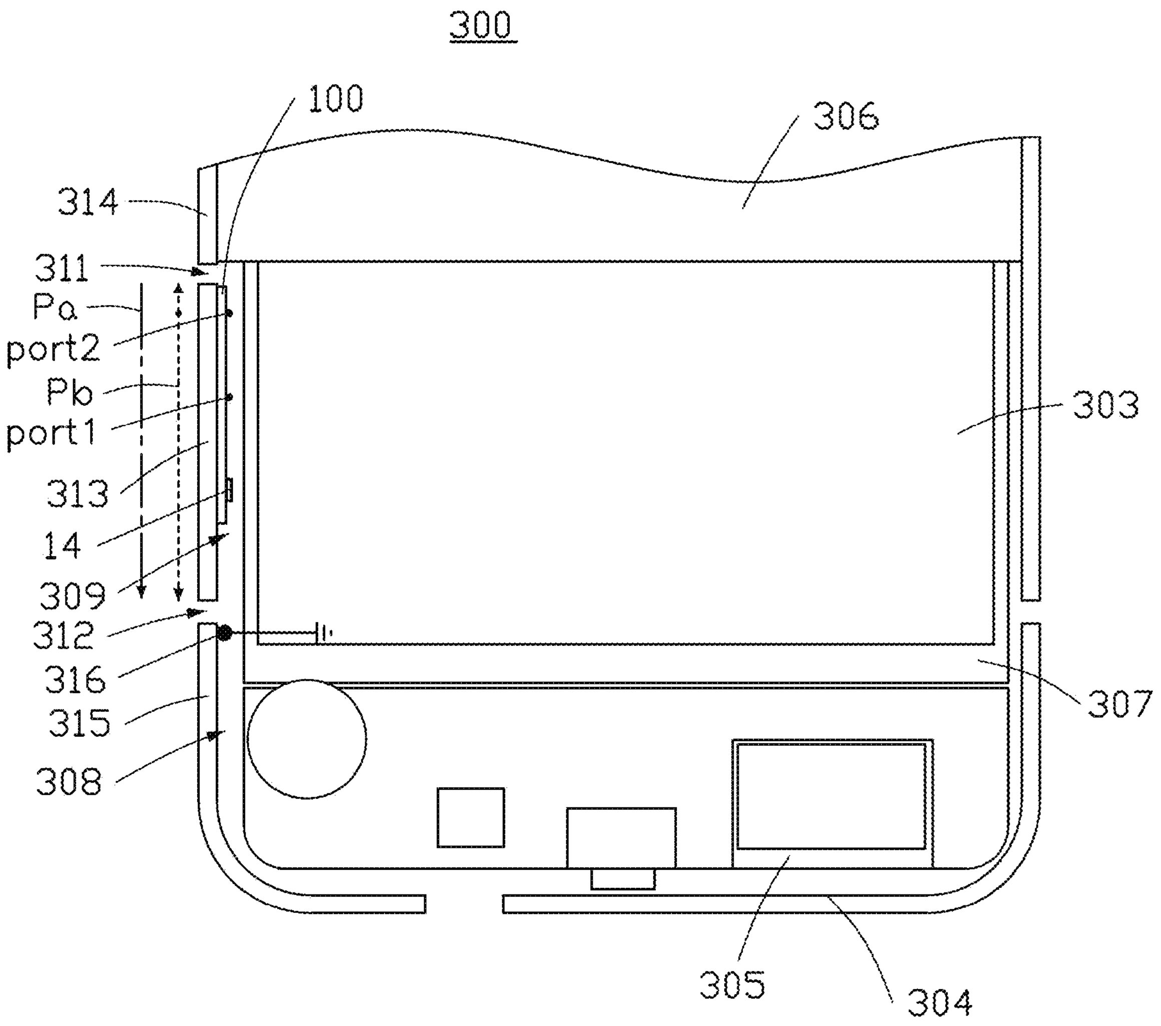
FIG. 8 is a schematic diagram of current paths of the antenna coupled feed module shown in FIG. 6.

FIG. 8 is a schematic diagram of the current path of the electronic device 300. The first coupled feed portion Patch 1 with the first signal feed point port 1 can excite middle frequency and high frequency (such as path Pa) modes. The middle frequency and high frequency modes can be achieved with the best antenna efficiency by using the slit 309, and the operation frequency range of the first coupled feed portion Patch 1 can cover the middle frequency band (1.71 GHz-2.17 GHz) and high frequency band (2.3 GHz-2.69 GHz).

The second coupled feed portion Patch 2 with the second signal feed point port 2 can excite an ultra-high bandwidth (UHB) mode and a 5G Sub 6 NR mode (such as path Pb). UHB band and 5G Sub6 NR modes can be achieved with best antenna efficiency by using slit 309. The operation frequency range of the second coupled feed portion Patch 2 can cover the UHF frequency band (3.3 GHz-5 GHz) and 5G Sub 6 NR frequency band (for example, 5G Sub 6 N77 frequency band (3.3 GHz-4.2 GHz), 5G Sub 6 N78 frequency band (3.3 GHz-3.8 GHz), and 5G Sub 6 N79 frequency band (4.4 GHz-5 GHz)).

The switch 131 is a middle frequency band, high frequency band, UHB and 5G Sub 6NR frequency band switch, used to switch to middle frequency band, high frequency band, UHB frequency band and 5G Sub 6 NR frequency band.

The antenna coupled feed module 100 can be applied to the electronic device 300, to increase the antenna efficiency bandwidth and have the best antenna efficiency, and the switching of the switch 131 can effectively improve the antenna frequency coverage. In one embodiment, the applicable operation frequency range of the antenna coupled feed module 100 can cover the middle frequency of 1.7 GHz to 2.17 GHz, the high frequency of 2.3 GHz-2.69 GHz, UHF 3.3 GHz-5 GHz, and can support 5G Sub 6 N77/N78/N79 frequency bands.

The first coupled feed portion Patch 1 and the second coupled feed portion Patch 2 of the antenna coupled feed module 100 may be set as independent sheet bodies, and signal feed points at appropriate positions of the first coupled feed portion Patch 1 and the second coupled feed portion Patch 2 may be correspondingly set. The metal layer 15 and the metal frame 304 (for example, the first part 313) are used as metal radiators, the metal layer 15, the metal frame 304. the first coupled feed portion Patch 1 and the second coupled feed portion Patch 2 in the slit 309, couple the energy to resonate the radiation mode covering middle frequency band, high frequency band, UHB frequency band, 5G Sub 6 N77, 5G Sub 6 N78, and 5G Sub 6 N79 frequency bands, so as to greatly increase bandwidth and antenna efficiency, and cover the world's commonly used 5G which is the application of communication frequency bands and meet the requirements of Carrier Aggregation (CA) supporting LTE-A (abbreviation for LTE-Advanced, which is the subsequent evolution of LTE technology).

Figure 9A:
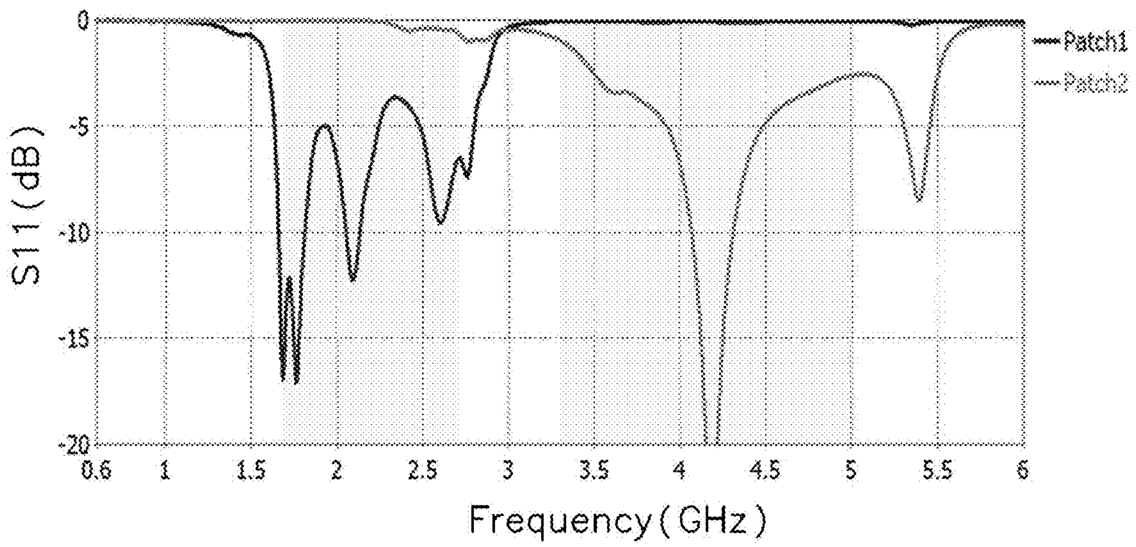
FIGS. 9A, 9B, and 9C are graphs of S parameters (scattering parameters) of the antenna coupled feed module as shown in FIGS. 3A, 3B, and 3C according to the embodiment of the present disclosure.
Figure 9B:
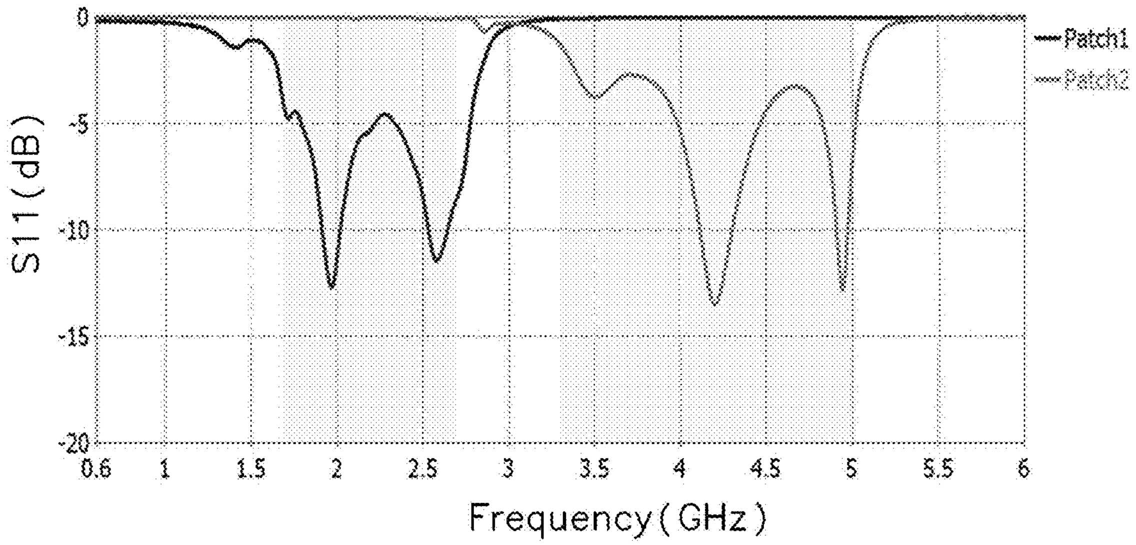
Figure 9C:
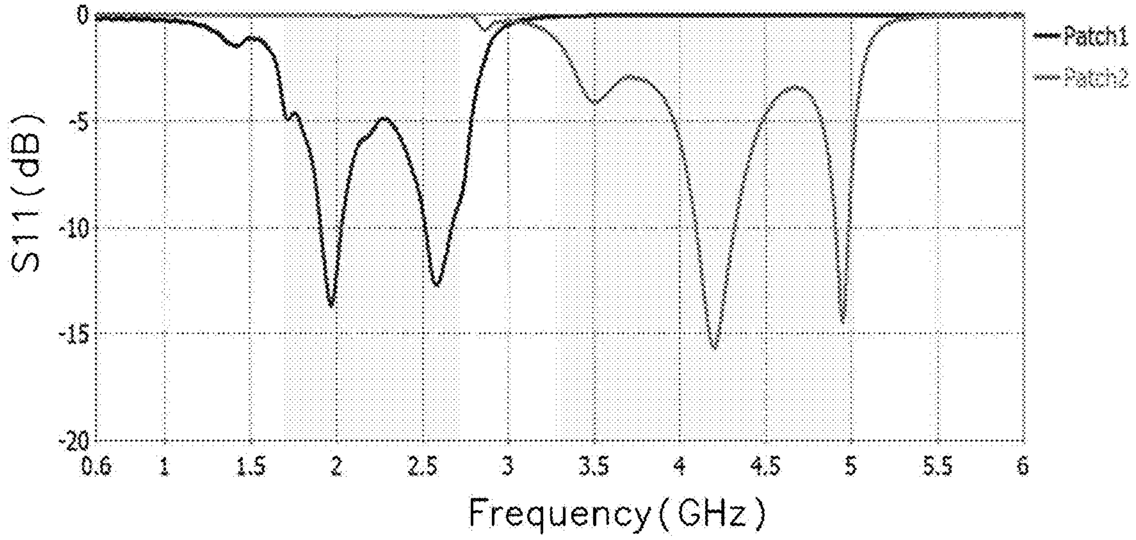

FIGS. 9A to 9C are graphs of S parameters (scattering parameters) when the first coupled feed portion Patch 1 and the second coupled feed portion Patch 2 of the antenna coupled feed module 100 correspond to different metal layers 15 (such as without metal layer in FIG. 3A and the metal layer 15 shown in FIGS. 3B and 3C). As shown in FIG. 9A, the first coupled feed portion Patch 1 and the second coupled feed portion Patch 2 without metal layer, and the switch 131 is used to generate independent modes with adjustability and satisfied antenna efficiency, the first coupled feed portion Patch 1, the metal layer 15, and the metal frame 304 may cover middle frequency band of 1.71 GHz-2.17 GHz and high frequency band of 2.3 GHz-2.69 GHz. The second coupled feed portion Patch 2, the metal layer 15, and the metal frame 304 may cover UHB frequency band 3.3 GHz-5 GHz, and can support 5G Sub N77/N78/N79 frequency bands. As shown in FIG. 9B, the first coupled feed portion Patch 1 and the second coupled feed portion Patch 2 correspond to the metal layer 15 as shown in FIG. 3B, and use the switch 131 to generate independent modes with adjustability and satisfied antenna efficiency, so the first coupled feed portion Patch 1, the metal layer 15, and the metal frame 304 may cover middle frequency band of 1.71 GHz-2.17 GHz and high frequency band of 2.3 GHz-2.69 GHz. The second coupled feed portion Patch 2, the metal layer 15, and the metal frame 304 may cover UHB frequency band 3.3 GHz-5 GHz, and can support 5G Sub 6 N77/N78/N79 frequency bands. As shown in FIG. 9C, the first coupled feed portion Patch 1 and the second coupled feed portion Patch 2 correspond to the metal layer 15 as shown in FIG. 3C, and use the switch 131 to generate independent modes with adjustability and satisfied antenna efficiency, so the first coupled feed portion Patch 1, the metal layer 15, and the metal frame 304 may cover middle frequency band of 1.71 GHz-2.17 GHz and high frequency band of 2.3 GHz-2.69 GHz. The second coupled feed portion Patch 2, the metal layer 15, and the metal frame 304 may cover UHF 3.3 GHz-5 GHz, and can support 5G Sub 6 N77/N78/N79 frequency bands.

The switch 131 can be switched to different signal feed points, the frequency modes can be controlled to cover the middle frequency of 1.71 GHz-2.17 GHz, and the high frequency of 2.3 GHz-2.69 GHz, UHF 3.3 GHz-5 GHz. 5G Sub 6 N77/N78/N79 frequency bands are also supported.

Figure 10A:
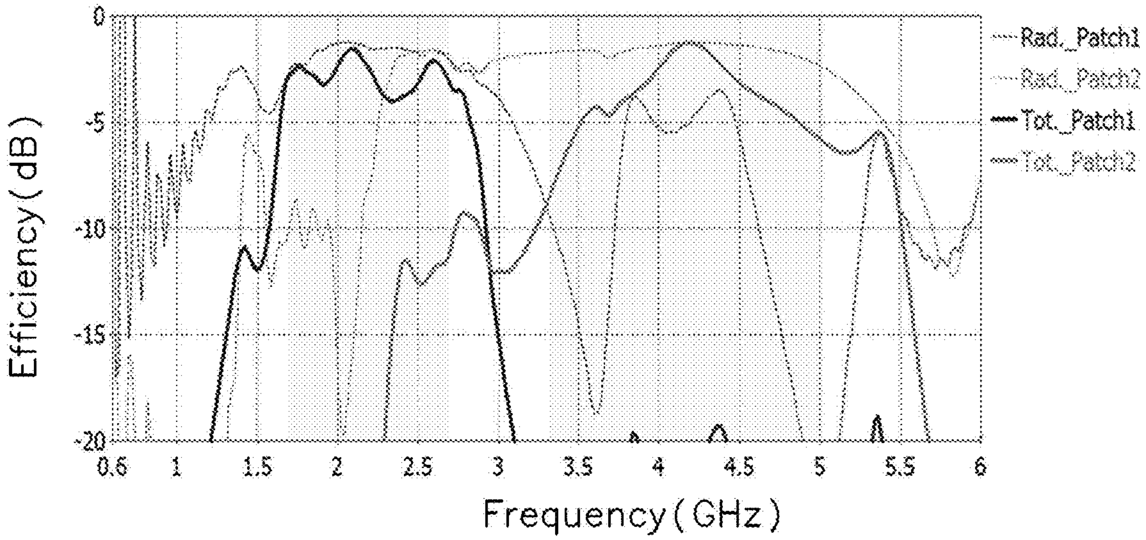
FIGS. 10A, 10B, and 10C are efficiency graphs of the antenna coupled feed module as shown in FIGS. 3A, 3B, and 3C according to the embodiment of the present disclosure.
Figure 10B:
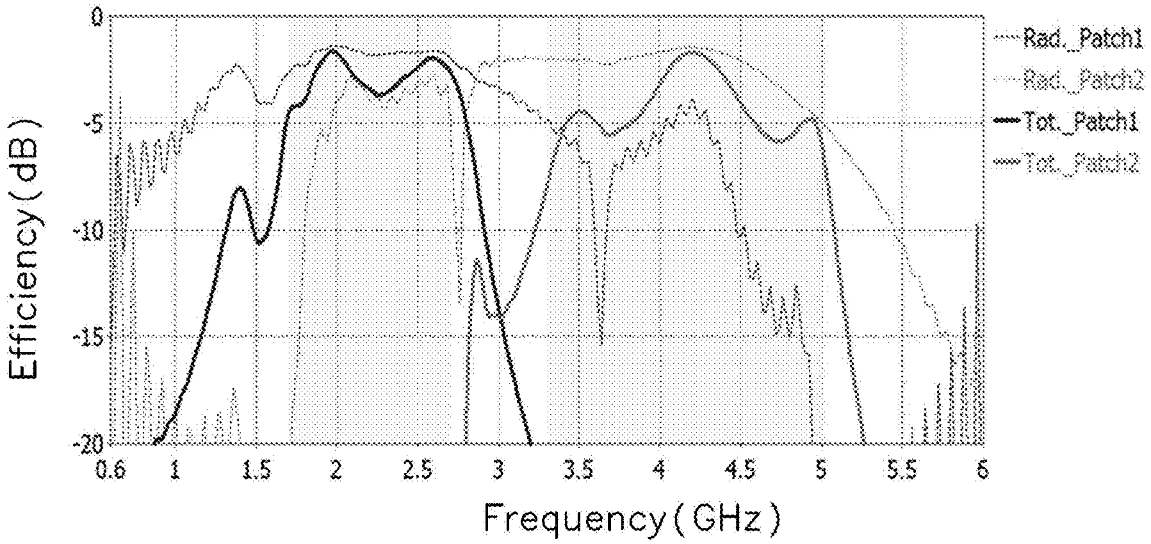
Figure 10C:
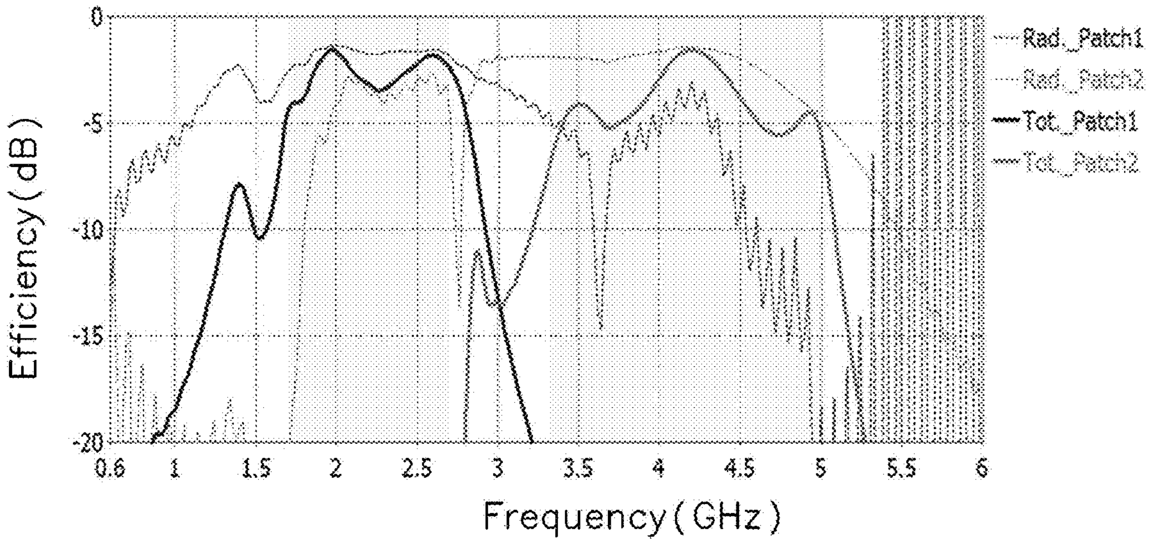

FIGS. 10A to 10C are efficiency graphs when the first coupled feed portion Patch 1 and the second coupled feed portion Patch 2 of the antenna coupled feed module 100 corresponding to different metal layer 15 (such as without metal layer in FIG. 3A and the metal layer 15 in FIGS. 3B and 3C). FIG. 10A shows the radiation efficiency (referred to as Rad. in the figure) and total efficiency (referred to as Tot. in the figure) values of each of the first coupled feed portion Patch 1 and the second coupled feed portion Patch 2 without metal layer, and using the switch 131 to generate independent modes with adjustability and satisfied antenna efficiency. FIG. 10B shows the radiation efficiency (referred to as Rad. in the figure) and total efficiency (referred to as Tot. in the figure) values of each of the first coupled feed portion Patch 1 and the second coupled feed portion Patch 2 corresponding to the metal layer 15 as shown in FIG. 3B, and the switch 131 is used to generate independent modes with adjustability and satisfied antenna efficiency. FIG. 10C shows the radiation efficiency (referred to as Rad. in the figure) and total efficiency (referred to as Tot. in the figure) values of each of the first coupled feed portion Patch 1 and the second coupled feed portion Patch 2 corresponding to the metal layer 15 as shown in FIG. 3C, and the switch 131 is used to generate independent modes with adjustability and satisfied antenna efficiency.

The antenna coupled feed module 100 sets the switch 131 and switches the switch 131 to different signal feed points, to control the frequency mode, and to cover the middle frequency band (1.71 GHz-2.17 GHz), the high frequency band (2.3 GHz-2.69 GHz), UHB (3.3 GHz-5 GHz), and can support 5G Sub 6 N77/N78/N79 frequency bands.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An antenna coupled feed module applied in an electronic device having a metal frame and at least one electronic component, and a slit formed by the metal frame and the at least one electronic component spaced apart, comprising:
- a substrate having a first surface and a second surface;
- a metal layer faced to the first surface and configured to conduct the electrical signals to the metal frame to radiate wireless signals;
- at least one coupled feed portion disposed on the first surface;
- an active circuit disposed on the second surface and configured to switch the electrical signals feeding to the at least one coupled feed portion; and
- a non-conductive layer arranged between the metal layer and the at least one coupled feed portion, and the non-conductive layer covering the at least one coupled feed portion;
- wherein the at least one coupled feed portion faces the metal layer and couples the electrical signals to the metal layer, at least one signal feed point electrically connects to the active circuit, the second surface is opposite to the first surface.

2. The antenna coupled feed module according to claim 1, wherein the antenna coupled feed module further comprises a connector, the active circuit and the connector are disposed on the second surface.

3. The antenna coupled feed module according to claim 1, wherein the substrate defines at least one via connecting the first surface and the second surface, the at least one coupled feed portion is electrically connected to the active circuit through the at least one via.

4. The antenna coupled feed module according to claim 1, wherein a projection area of the metal layer along a first direction is same as a projection area of the non-conductive layer along the first direction.

5. The antenna coupled feed module according to claim 1, wherein the metal layer is positioned within a projection range of the non-conductive layer along a first direction.

6. The antenna coupled feed module according to claim 1, wherein a projection of the metal layer along a first direction covers a projection of the at least one coupled feed portion along the first direction.

7. The antenna coupled feed module according to claim 1, wherein the at least one coupled feed portion comprises a first coupled feed portion and a second coupled feed portion, the first coupled feed portion and the second coupled feed portion are spaced from each other.

8. The antenna coupled feed module according to claim 1, wherein the at least one coupled feed portion is a conductive sheet.

9. The antenna coupled feed module according to claim 1, wherein the active circuit comprises a switch and a plurality of adjustable elements, a frequency radiation mode of the antenna coupled feed module is controlled by switching the switch to a corresponding adjustable element and a corresponding feed source, to cover a middle frequency band, a high frequency band, an ultra-high frequency band (UHB), and a 5G Sub 6 NR frequency band.

10. The antenna coupled feed module according to claim 1, wherein the non-conductive layer is made of one or more materials from fire resistant (FR4) materials, aluminum oxide (AL2O3) materials, Arlon materials, and ceramic materials.

11. An electronic device comprising:

a metal frame;

at least one electronic component, the metal frame and the at least one electronic component spaced apart from each other and forming a slit;

an antenna coupled feed module received in the slit, comprising:

a substrate having a first surface and a second surface;

a metal layer facing to the first surface and configured to conduct the electrical signals to the metal frame to radiate wireless signals;

at least one coupled feed portion disposed on the first surface;

an active circuit disposed on the second surface and configured to switch the electrical signals feeding to the at least one coupled feed portion; and a non-conductive layer arranged between the metal layer and the at least one coupled feed portion, and the non-conductive layer covering the at least one coupled feed portion;

wherein the at least one coupled feed portion faces the metal layer and couples the electrical signals to the metal layer, at least one signal feed point electrically connects to the active circuit, the second surface is opposite to the first surface.

12. The electronic device according to claim 11, wherein the antenna coupled feed module further comprises a connector, the active circuit and the connector are disposed on the second surface.

13. The electronic device according to claim 11, wherein the substrate defines at least one via connecting the first surface and the second surface, the at least one coupled feed portion is electrically connected to the active circuit through the at least one via.

14. The electronic device according to claim 11, wherein a projection area of the metal layer along a first direction is same as a projection area of the non-conductive layer along the first direction.

15. The electronic device according to claim 11, wherein the metal layer is positioned within a projection range of the non-conductive layer along a first direction.

16. The electronic device according to claim 11, wherein a projection of the metal layer along a first direction covers a projection of the at least one coupled feed portion along the first direction.

17. The electronic device according to claim 11, wherein the at least one coupled feed portion comprises a first coupled feed portion and a second coupled feed portion, the first coupled feed portion and the second coupled feed portion are spaced from each other.

18. The electronic device according to claim 11, wherein the at least one coupled feed portion is a conductive sheet.

19. The electronic device according to claim 11, wherein the active circuit comprises a switch and a plurality of adjustable elements, a frequency radiation mode of the antenna coupled feed module is controlled by switching the switch to a corresponding adjustable element and a corresponding feed source, to cover a middle frequency band, a high frequency band, an ultra-high frequency band (UHB), and a 5G Sub 6 NR frequency band.

20. The electronic device according to claim 11, wherein the non-conductive layer is made of one or more materials from fire resistant (FR4) materials, aluminum oxide (AL2O3) materials, Arlon materials, and ceramic materials.

* * * * *